US009696442B2

(12) United States Patent
Li et al.

(10) Patent No.: US 9,696,442 B2
(45) Date of Patent: Jul. 4, 2017

(54) METHOD FOR ESTIMATING SUBSURFACE PROPERTIES FROM GEOPHYSICAL SURVEY DATA USING PHYSICS-BASED INVERSION

(71) Applicants: Weichang Li, Annandale, NJ (US); Max Deffenbaugh, Flushear, TX (US); Dominique G. Gillard, Houston, TX (US); Ganglin Chen, Houston, TX (US); Xiaoxia Xu, Houston, TX (US)

(72) Inventors: Weichang Li, Annandale, NJ (US); Max Deffenbaugh, Flushear, TX (US); Dominique G. Gillard, Houston, TX (US); Ganglin Chen, Houston, TX (US); Xiaoxia Xu, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 480 days.

(21) Appl. No.: 14/506,178

(22) Filed: Oct. 3, 2014

(65) Prior Publication Data
US 2015/0120196 A1    Apr. 30, 2015

Related U.S. Application Data

(60) Provisional application No. 61/897,019, filed on Oct. 29, 2013.

(51) Int. Cl.
*G01V 1/40* (2006.01)
*G01V 1/30* (2006.01)
(Continued)

(52) U.S. Cl.
CPC ............... *G01V 1/306* (2013.01); *G01V 1/30* (2013.01); *G01V 1/40* (2013.01); *G01V 3/26* (2013.01);
(Continued)

(58) Field of Classification Search
CPC ..................................................... G01V 1/306
See application file for complete search history.

(56) References Cited

U.S. PATENT DOCUMENTS

| 5,444,619 A | 8/1995 | Hoskins et al. |
| 5,638,269 A | 6/1997 | Fournier et al. |

(Continued)

FOREIGN PATENT DOCUMENTS

| EP | 0 674 189 | 12/2000 |
| WO | WO 01/25823 | 4/2001 |

(Continued)

OTHER PUBLICATIONS

Arns, C.H. et al. (2002), "Computation of linear elastic properties from microtomographic images: Methodology and agreement between theory and experiment," *Geophysics* 67, pp. 1396-1405.

(Continued)

*Primary Examiner* — Phuong Huynh
(74) *Attorney, Agent, or Firm* — ExxonMobil Upstream Research Company—Law Department (57) ABSTRACT

A hydrocarbon exploration method for determining subsurface properties from geophysical survey data. Rock physics trends are identified and for each trend a rock physics model is determined that relates the subsurface property to geophysical properties (103). The uncertainty in the rock physics trends is also estimated (104). A geophysical forward model is selected (105), and its uncertainty is estimated (106). These quantities are used in an optimization process (107) resulting in an estimate of the subsurface property and its uncertainty.

8 Claims, 7 Drawing Sheets

(51) Int. Cl.
*G01V 7/00* (2006.01)
*G01V 3/26* (2006.01)
*G01V 3/38* (2006.01)
*G01V 7/06* (2006.01)
*G06F 11/30* (2006.01)

(52) U.S. Cl.
CPC ................ *G01V 3/38* (2013.01); *G01V 7/00* (2013.01); *G01V 7/06* (2013.01); *G01V 2210/667* (2013.01)

(56) References Cited

U.S. PATENT DOCUMENTS

| | | | |
|---|---|---|---|
| 6,516,080 | B1 | 2/2003 | Nur |
| 6,950,786 | B1 | 9/2005 | Sonneland et al. |
| 7,127,353 | B2* | 10/2006 | Geiser .................... G01V 1/306 702/13 |
| 7,369,980 | B2 | 5/2008 | Deffenbaugh et al. |
| 7,606,691 | B2* | 10/2009 | Calvert .................... G01V 1/32 702/14 |
| 2005/0015231 | A1 | 1/2005 | Edwards et al. |
| 2009/0299709 | A1 | 12/2009 | Liu |

FOREIGN PATENT DOCUMENTS

| | | |
|---|---|---|
| WO | 02/065374 | 8/2002 |
| WO | WO 2009/065036 | 5/2009 |
| WO | WO 2009/108432 | 9/2009 |
| WO | 2011/115921 | 9/2011 |

OTHER PUBLICATIONS

Arns, C.H. et al. (2004), "Virtual permeametry on microtomographic images,"*J. Petroleum Science and Engineering* 45, pp. 41-46.

Avesth, P. et al. (2010), "Quantitative Seismic Interpretation: Applying Rock Physics Tools to Reduce Interpretation Risks," Cambridge University Press, pp. 336-338.

Bencsik, M. et al. (2001), "Method for measuring local hydraulic permeability using magnetic resonance imaging," *Phys. Rev. E* 63, 4 pgs.

Berryman, J.G. et al. (1997), "Explicit schemes for estimating elastic properties of multiphase composites," *Stanford Exploration Project, Report* 79, pp. 243-258.

Bohn, R.B. et al. (2003), "User Manual for Finite Element and Finite Difference Programs: A Parallel Version of NIST IR 6269," Abstract, 1 pg.

Dvorkin, J. et al. (1996), "Elasticity of high-porosity sandstones: Theory for two North Sea data sets," *Geophysics* 61, pp. 1363-1370.

Flannery, B.P. et al. (1987), "Three-dimensional x-ray microtomography," *Science* 237, pp. 1439-1444.

Greenberg, M.L. et al. (1992), "hear wave velocity estimation in porous rocks: theoretical formulation, preliminary verification, and applications," *Geophysical Prospecting* 40, pp. 195-209.

Keehm, Y. et al. (2001), "Computational rock physics at the pore scale: Transport properties and diagenesis in realistic pore geometries," *The Leading Edge* 20, pp. 180-183.

Knackstedt, et al. (2005), "Velocity-porosity relationships: Predictive velocity model for cemented sands composed of multiple mineral phases," *Geophysical Prospecting* 53, pp. 1-24.

Kuster, G.T. et al. (1974), "Velocity and attenuation of seismic waves in two-phase media: Part I. Theoretical formulations," *Geophysics* 39, pp. 587-606.

Martys, N.S. (2001), "Improved approximation of the Brinkman equation using a lattice Boltzmann method," *Phys. Fluids* 13, pp. 1807-1810.

Øren, P.-E. et al. (2002), "Process based reconstruction of sandstones and prediction of transport properties," *Transport in Porous Media* 46, pp. 311-343.

Øren, P.-E. et al. (2006), "Direct pore-scale computation of material and transport properties on North-Sea reservoir rocks," Computational Methods in Water Resources XVI, Copenhagen, Denmark, 11 pgs.

Spanne, P. et al. (1994), "Synchrotron computed microtomography of porous media: Topology and transports," *Physical Review Letters* 73(14), pp. 2001-2004.

Torquato, S. et al. (1999), "Effective conductivity, dielectric constant, and diffusion coefficient of digitized composite media via first-passage-time equations," *J. Appl. Phys.* 85, pp. 1560-1571.

Willis, J.R. (1977), "Bounds and self-consistent estimates for the overall properties of anisotropic composite," *Journal of Mechanics and Physics of Solids* 25, pp. 185-202.

Worthington, P.F. (1985), "Evolution of shaley sand concepts in reservoir evaluation," *The Log Analyst* 26, pp. 23-40.

Jiang, W. et al. (2012), "Petrophysical-properties stochastic inversion combining geostatistics and statistical rock-physics: applications to seismic data near ODP1144," SEG Las Vegas 2012 Annual Meeting, 5 pgs.

Tompkins, M.J. et al. (2011), "Scalable uncertainty estimation for nonlinear inverse problems using parameter reduction, constraint mapping, and geopmetric sampling: Marine controlled-source electromagnetic examples," *Geophysics* 70(4), pp. F263-F281.

*International Search Report and Written Opinion*, PCT/US2014/059096, dated Apr. 2, 2015.

\* cited by examiner

METHOD FOR ESTIMATING SUBSURFACE PROPERTIES FROM GEOPHYSICAL SURVEY DATA USING PHYSICS-BASED INVERSION

CROSS-REFERENCE TO RELATED APPLICATION

This application claims the benefit of U.S. Provisional Patent Application 61/897,019, filed Oct. 29, 2013, entitled METHOD FOR ESTIMATING SUBSURFACE PROPERTIES FROM GEOPHYSICAL SURVEY DATA USING to PHYSICS-BASED INVERSION, the entirety of which is incorporated by reference herein.

FIELD OF THE INVENTION

This invention relates generally to the field of geophysical prospecting. Specifically, the invention is a hydrocarbon exploration method for determining the fluid content and rock properties of subsurface reservoirs from geophysical survey data such as seismic surveys, resistivity surveys, and gravity surveys.

BACKGROUND OF THE INVENTION

In the oil and gas industry, geophysical prospecting techniques commonly are used to aid in the search for and evaluation of subterranean hydrocarbon resources. These resources are found in hydrocarbon reservoirs, which are porous bodies of rock in the subsurface where the pore space within the rock is at least partly filled by hydrocarbons. The profitability of drilling and producing hydrocarbons from a reservoir depends on both the type or types of fluid contained in the pore space of the reservoir rock, such as oil, natural gas, or ground water, and the reservoir properties of the rock, such as its porosity and permeability. In geophysical prospecting, the fluid type and reservoir properties are estimated from geophysical survey data collected at or near the surface, such as seismic data, resistivity data or gravity data.

The composition and structure of a reservoir rock and the type of fluid in the pore space of the rock influence the reflection and transmission of seismic waves by the rock and the conductivity and dielectric constant of the rock. Relationships among seismic, electrical and reservoir properties are exploited in geophysical prospecting for hydrocarbons, where data from seismic or electromagnetic surveys are used to predict the spatially-varying properties of a reservoir. The predicted reservoir properties are the basis for decisions about how many wells to drill, the type of well to drill, and where the wells should be placed to optimally recover the resource from the reservoir.

Various methods are applied to determine fluid and reservoir properties from geophysical survey data. These methods fall generally into two categories: interpretation and inversion. Interpretation methods use geophysical survey data to understand the geological structure and history of a subsurface region. From this information, an experienced interpreter can assess whether a subsurface location is likely to be a hydrocarbon reservoir. Inversion methods determine the most likely reservoir and fluid properties based on numerical models which can simulate geophysical survey data for any set of reservoir and fluid properties. In an inversion, various subsurface distributions of reservoir and fluid properties are tried until the numerical model produces simulated survey data that most nearly resembles the actual survey data. Inversion methods provide a direct estimate of those properties needed to determine the economic potential of a reservoir; however, inversion methods tend to require better quality survey data than interpretation methods and inversion estimate accuracy can depend significantly on local rock properties. In practice, both methods are usually applied when evaluating a prospective reservoir. The present inventive method is an inversion method.

The components of an inversion are generally geophysical survey data, an earth model, a rock physics model, a geophysical forward model, and an objective function. The speed and accuracy of the inversion depends on the choice of these components. These components are now described in greater detail. Geophysical survey data refers to measurements collected at points along a line or over an area at, near or above the surface of the earth and which sense properties of the subsurface. Examples of geophysical surveys include seismic surveys which sense the seismic wave velocities and density in the subsurface, magnetotelluric (MT) surveys or controlled-source electromagnetic (CSEM) surveys which sense the electrical resistivity of the subsurface, and gravity surveys which sense the density of the subsurface. Passive seismic surveys are another kind of geophysical survey where seismic wave velocities and density in the subsurface are sensed using naturally occurring seismic sources such as microseismicity or earthquakes instead of active seismic sources. The form of seismic, MT, and CSEM survey data is one or more digital data files. Seismic data, for example, are typically digitally sampled time series from each hydrophone or geophone where the amplitude of each sample corresponds to the strength of a subsurface reflection and the time of each sample corresponds to the depth of the subsurface feature that produced the reflection. The form of gravity survey data is typically a digitally sampled time series where each sample corresponds to the perturbation in the earth's gravitational field due to density variations in the area below the gravimeter while the gravimeter is moved along a survey line. Each type of geophysical survey data responds in a unique way to subsurface rock and fluid properties. Data from more than one type of geophysical survey can be processed together in a joint inversion to form a more accurate estimate of rock and fluid properties by exploiting the complementary information in differing data types.

The earth model is the framework used to represent the subsurface properties. The specific values of the properties throughout the earth model are determined from the geophysical survey data. In common practice, the earth model divides a subsurface region into cells and gives a value for each rock and fluid property in each cell. Some earth models specify a probability distribution or statistics of a probability distribution rather than a single value for each rock and fluid property in each cell. The selection of cell size is a challenge in creating earth models. In sedimentary basins, where hydrocarbon reservoirs are found, the subsurface is composed of various rock types, often in layers. A hydrocarbon reservoir may be composed of several layers of permeable rock (such as a sandstone or permeable limestone) which contain the hydrocarbons and are separated by layers of impermeable rock (such as a shale or impermeable limestone). These rock layers are often thinner than the vertical resolution of the geophysical survey. Thus each sample in the survey data is sensing an "effective" property of the subsurface that averages together the properties of several or more layers. If the earth model uses a fine grid of cells to capture the individual layer properties, the cells can be so small compared to the resolution of the survey data that their properties cannot be uniquely determined from the data. If the earth model uses a coarse grid of cells to capture effective properties at the resolution scale of the survey data, it can be difficult to isolate the fluid type and rock properties of the permeable reservoir from an effective property value which averages permeable and impermeable layers.

Rock physics models relate the rock and fluid properties of the reservoir to the geophysical properties sensed by the geophysical survey data. Unlike the earth model, in which numerical values of one or more geophysical properties are specified on a discrete grid, the rock physics model describes the relationship between the reservoir rock/fluid properties and the geophysical properties. This can be mathematical relationships in analytical form or qualitative trends reflected in nonparametric form. Most rock physics models relate the bulk properties of a rock (such as stiffness, elastic moduli, density, seismic wave velocities, resistivity, conductivity, or permeability) to the composition of the rock, expressed as the volume fractions of the material phases (both grain types and pore types) that make up the rock. Reservoir rocks are typically sedimentary rocks composed of several different material phases. For example, in a siliciclastic rock, the phases might be grains of various mineral types (e.g., quartz or feldspar) and various size ranges, as well as cements of various mineral types (e.g., quartz or calcite) which bind the grains together, pore spaces between the grains, and clay or shale that may fully or partly fill the pore spaces or may form layers in the rock. In a carbonate rock, the phases might be for example one or more types of shell fragments, skeletal remains, microporous regions, vugs, and intergranular pores. Rocks of a common origin will typically contain the same phases, though the volume fractions of the phases may vary.

In general, there would be no consistent relationship between the bulk properties of a rock and its composition, since different rock microstructures can produce different bulk properties from the same phase volume fractions. However, rocks with a common origin and history tend to have a similar microstructure so that consistent trends between bulk properties and phase volume fractions are found among such genetically related rocks. There are two classes of models applied to represent these trends. Empirical models are generally determined by a linear regression of measured bulk properties and measured phase volume fractions. Theoretical models are based on effective medium theories, but generally still have empirical parameters that must be calibrated to fit rock property measurements. For both model classes, the calibration measurements may come from well log data or laboratory measurements on rock samples, and in both cases, the depth interval in the log or the samples used must be genetically related rocks for consistent trends to be found. Ideally the data should come from the reservoir of interest, so that the trends discovered are those found in the reservoir. However, in practice, logs or samples are often taken from a geological analog of the reservoir, that is, a different but geologically similar body of rock.

The geophysical forward model predicts the geophysical survey data from the geophysical properties of the subsurface. In a forward model, a wave propagation equation is solved numerically, on a discrete computational grid using a computer, to simulate the measured survey data. Input quantities include the given earth model and the excitation source signal. The predicted geophysical responses can subsequently be compared against the measured responses. The error between the computed and the measured responses may then be used to update the earth model parameters.

Geophysical forward models range in accuracy and computational speed. For example, a simple seismic forward model assumes that the reflection amplitude in stacked seismic data depends on the difference in acoustic impedance (compressional wave velocity times density) between rock layers. This model ignores the variation in reflection amplitude with angle, but is very fast to compute. A more accurate geophysical forward model relates the amplitudes of partial stacks, that is, stacks of seismic data traces within separate offset ranges such as "near" offsets from 0 to 2000 m and "far" offsets from 2000 m to 4000 m. Partial stacks give averaged reflection amplitudes over distinct offset or reflection angle ranges. These averaged amplitudes may be related to the compressional and shear wave velocities and densities above and below a reflecting interface between rock layers, where the reflection amplitude may be based on either the approximate but simpler Aki-Richards equations or the more accurate but more complicated Zoeppritz equations. Still more accurate, the forward model may relate the amplitude at every offset in a common mid-point seismic data gather to the compressional and shear wave velocities and densities above and below the reflecting interface based on either Aki-Richards equations or Zoeppritz equations. This model retains more of the information about seismic properties than the full-stack or partial-stack model, but at the cost of operating on a larger (unstacked) data set. The most accurate forward models involve a wave propagation simulation on a 3-dimensional model of compressional and shear velocities and densities, however such models require significant computational time and so are not often used in the analysis of geophysical survey data.

A limitation of most inversion methods is that they do not incorporate a statistical description of the difference between geophysical model predictions and the geophysical measurements, even though this model error can have spatial and temporal correlations and amplitude variations that must be considered in order to form an optimal estimate of the subsurface properties from the data. The minority of inversion methods that use a statistical measurement noise model apply an overly simple model which does not capture the correlations in the noise found in real data.

The most commonly used objective function for seismic inversion is least squares, where the subsurface properties are found for which the squared difference between the simulated survey data and the actual survey data is minimized. Alternatively, other functions of the difference between the simulated and actual survey data are minimized. Preferentially, the objective function should account for the likelihood of the given subsurface properties as well as the simple magnitude of the differences in the simulated and actual survey data.

A further limitation of current inversion techniques is that since they do not compute posterior probability distributions or any function of those distributions, they cannot provide error statistics of their estimates. This is a significant limitation since assigning correct uncertainties to the fluid and reservoir property predictions is essential to quantifying the financial risks of developing the reservoir.

Rock physics models are approximate relationships. They do not exactly predict the bulk properties of the rock from its composition. Error in the rock physics models introduces a certain amount of uncertainty into the prediction of reservoir properties from geophysical data. A limitation of the rock physics models used in current practice is that they do not contain a statistical description of the model uncertainty.

Geophysical data sets are commonly very large. One common practice in processing geophysical data is to reduce a geophysical data set to one or more smaller data sets which are functions of the original data set. These smaller data sets are sometimes called "attributes" of the original data set. Examples of typical attributes include the amplitude of the near offset reflection at each subsurface location, the amplitude of the far offset reflection at each subsurface location, the curvature of the reflected wavelet from a subsurface horizon of interest, etc. The function used to form the attributes is commonly determined empirically by forming trial attributes and evaluating which attributes best correlate with the subsurface properties of interest. The attribute or attributes selected by this empirical process may not capture all the information in the original data set about the subsurface properties of interest. Accordingly, there is a need for a method of selecting attributes which optimally captures information about the subsurface properties of interest.

From the foregoing, it can be seen that there is a need in hydrocarbon exploration for a method of accurately and quickly determining subsurface properties from geophysical survey data. Preferably, such a method should utilize an earth model which can be uniquely determined from the geophysical survey data yet directly specifies the fluid and rock properties of the reservoir, should utilize rock physics models that incorporate true physical constraints without making geometrical approximations regarding rock microstructure, should take into account the uncertainty in the rock physics constraints and the noise in the geophysical data, should operate on pre-stack gathers so that information is not lost by stacking or partial stacking, should output attributes or property estimates that minimize a function of the expected property error not the data consistency, and should output the uncertainty in the property estimates. The present invention satisfies this need.

SUMMARY OF THE INVENTION

In one embodiment, the invention is a method for predicting a subsurface property from geophysical measurements, comprising: (a) determining one or more rock type trends in the subsurface, and identifying a rock physics model for each trend that mathematically relates the subsurface property to one or more geophysical properties; (b) determining a statistic describing uncertainty in each rock type trend and its rock physics model; (c) selecting a geophysical forward model for predicting the geophysical measurements using current values of the subsurface property at a plurality of subsurface spatial locations; (d) determining a statistic describing uncertainty in the geophysical forward model in predicting the geophysical measurements; (e) forming an estimate of the subsurface property and its associated uncertainty, using a computer, which estimate minimizes misfit between the geophysical measurements and forward-modeled predictions of the geophysical measurements, using the one or more rock type trends and their rock physics models, the uncertainties in the rock type physics trends and in the forward model, and (f) using the estimate of the subsurface property to assess commercial potential of a subsurface reservoir. The geophysical measurements may be, for example, seismic data traces, seismic reflection amplitudes, resistivity survey traces, gravity survey traces, passively recorded seismic signals, and any combination thereof. The subsurface property may be, for example, the density of the pore fluid, the acoustic velocity in the pore fluid, a fluid factor combining the density and velocity of the pore fluid, the porosity of the reservoir rock, the volume fraction of shale in the reservoir rock, volume fraction of at least one phase in the reservoir rock, the permeability of the reservoir rock, or any combination thereof.

In another embodiment, the invention is a method for predicting a subsurface property from geophysical measurements, comprising: (a) obtaining geophysical survey data, (b) selecting an earth model populated by values of a subsurface property, (c) determining a rock physics model, (d) determining the uncertainty in the rock physics model, (e) selecting a geophysical forward model, (f) determining a statistic of the noise in the geophysical survey data, (g) selecting one or more subsurface properties to be estimated, (h) selecting an error metric to be minimized in the estimate of the subsurface properties, (i) based on the rock physics model and the geophysical forward model and the noise statistic, forming one or more attributes from the geophysical data from which the subsurface properties of interest may be estimated with substantially the same error metric value as from the full geophysical data sets, (j) using the attributes, the rock physics model, the geophysical forward model and the noise statistic, to form an estimate of said subsurface properties of interest in the earth model, (k) determining an error statistic of the estimate, and (l) using the estimate of the subsurface properties of interest throughout the earth model and the error statistic of the estimate to assess the commercial potential of a subsurface reservoir. This method can be applied when the geophysical measurements are, for example, seismic data traces, seismic reflection amplitudes, resistivity survey traces, gravity survey traces, passively recorded seismic signals, or any combination thereof. The subsurface property may be, for example, the density of the pore fluid, the acoustic velocity in the pore fluid, a fluid factor combining the density and velocity of the pore fluid, the porosity of the reservoir rock, the volume fraction of shale in the reservoir rock, volume fraction of at least one phase in the reservoir rock, the permeability of the reservoir rock, and any combination thereof.

BRIEF DESCRIPTION OF THE DRAWINGS

The present invention will be better understood by referring to the following detailed description and the attached drawings in which.

The data shown in these images and used to generate the test examples shown herein are from Avseth, et al. 2010. The invention will be described in connection with example embodiments. To the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
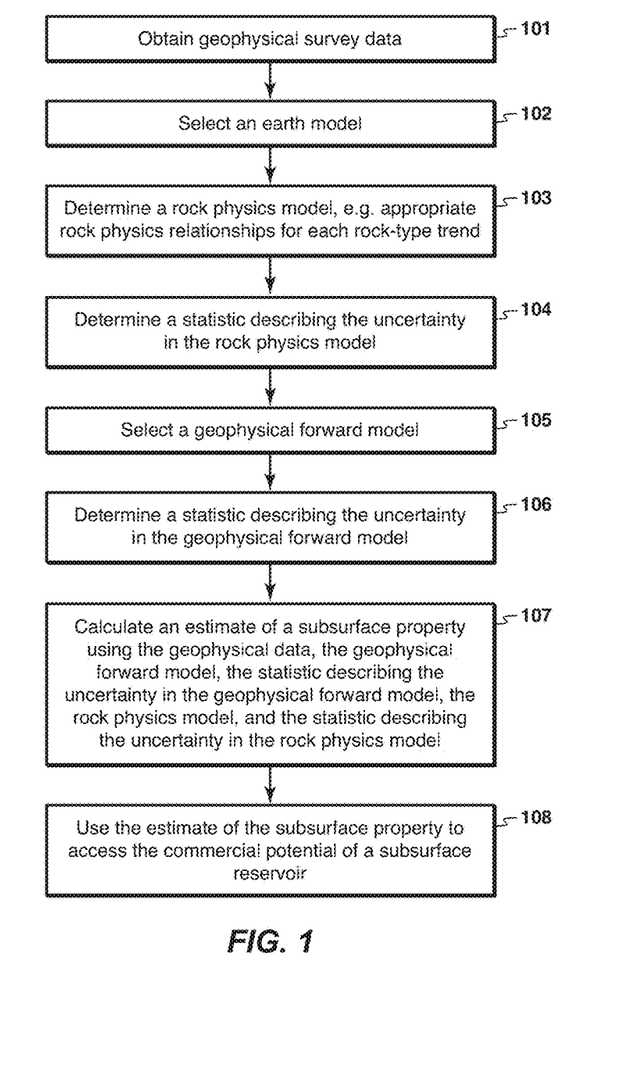
FIG. 1 is a flow chart showing basic steps in one embodiment of the present inventive method.
Figure 3:
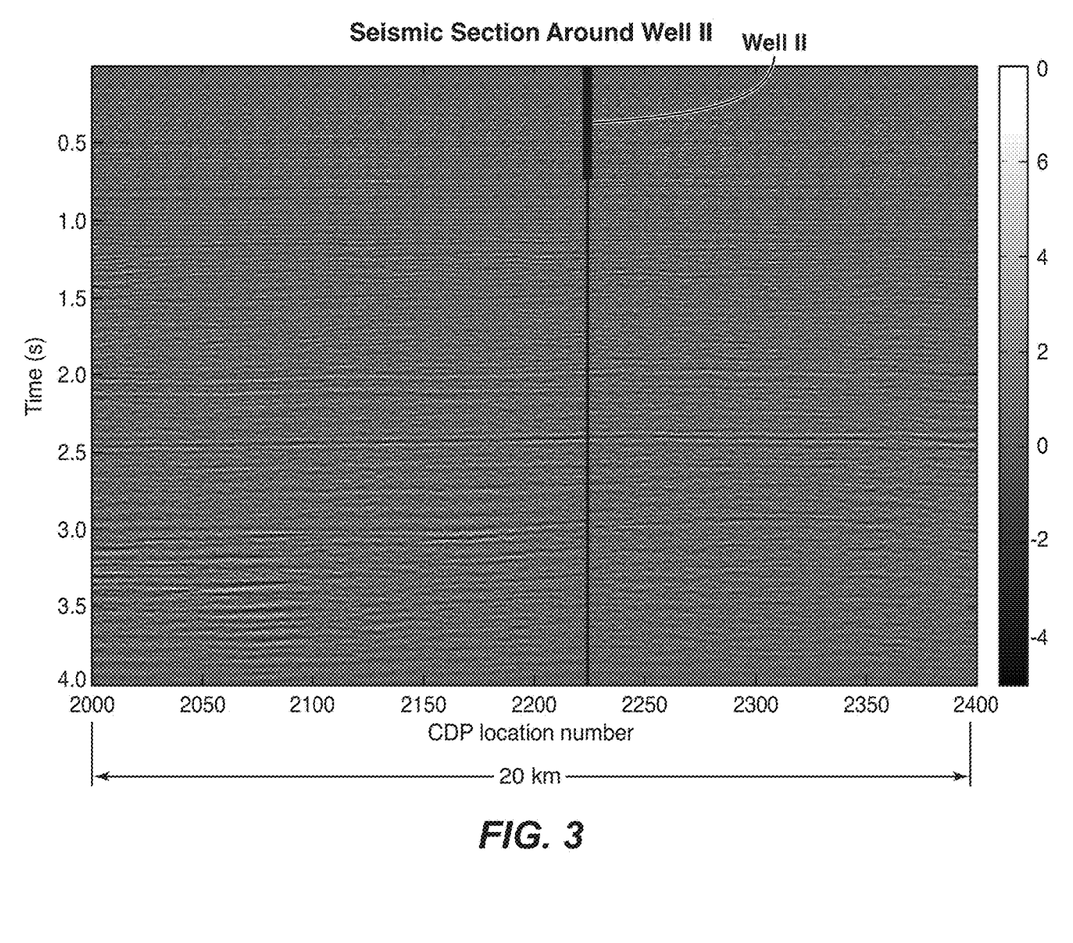
FIG. 3 shows an example of a 2D seismic section containing NMO corrected pre-stack CDP gathers.

A first embodiment of the invention will now be described. With reference to FIG. 1, this embodiment involves procedures to estimate the rock and fluid properties of a subsurface reservoir from geophysical survey data. As illustrated in FIG. 1, geophysical survey data is obtained (step 101). The inventive method may be applied to geophysical survey data of a single type, for example to a seismic survey, a 2D case example of which is shown in FIG. 3, or of multiple types, for example combining at least two of: a seismic survey, a CSEM survey, an MT survey, a gravity survey, and a passive seismic survey, where the multiple survey data types sense properties of overlapping subsurface regions. Persons of ordinary skill in the art with the benefit of this disclosure will recognize that the present inventive method may be applied to these and other types of geophysical survey data singly or in combination.

Step 102 is selecting an earth model which gives the subsurface properties of interest throughout the subsurface. Earth models that contain a single value for rock or fluid properties and those that provide information about the probability distributions of rock and fluid properties can both be used with the inventive method. Earth models of both fine and coarse gridding can also be used as well as models with adaptive gridding that adjusts grid size, for example, in response to geological complexity or scale. In one preferred embodiment of the invention, a novel earth model is used. This novel earth model is based on inventor recognition that within a reservoir-scale subsurface region, the earth can be approximated as consisting of a small number of rock types and that the individual layers or bodies of each rock type commonly cannot be separately distinguished in geophysical survey data. Thus the earth property sensed by each sample of geophysical survey data is an effective property reflecting an averaging (though not strictly an arithmetic average) of rock properties within a volume. Instead of specifying actual rock properties on a grid fine enough to represent the separate layers of each rock type or specifying effective properties on a coarse grid corresponding to geophysical survey resolution, the novel model specifies the properties of all rock types that contribute to each geophysical survey data point and the volume fraction of each rock type.

Figure 5A:
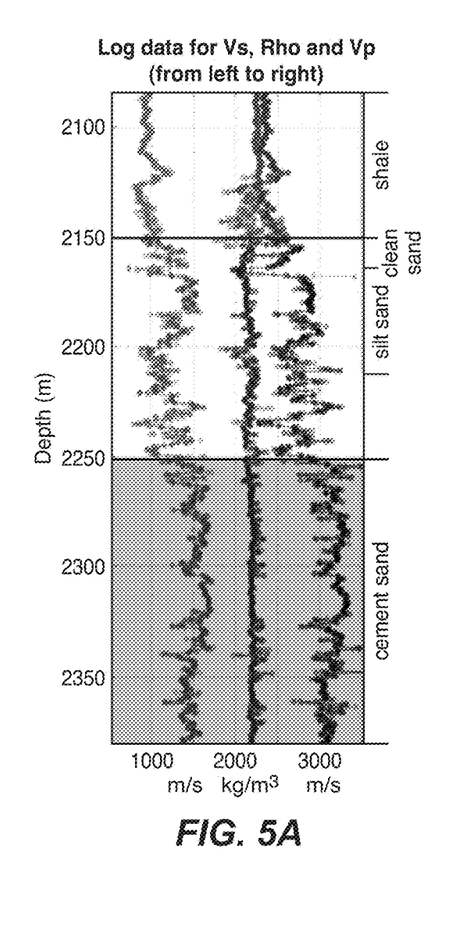
FIG. 5A shows an example of well log measurements of compressional wave velocity (Vp), shear wave velocity (Vs), and density (rho) versus depth.
Figure 5B:
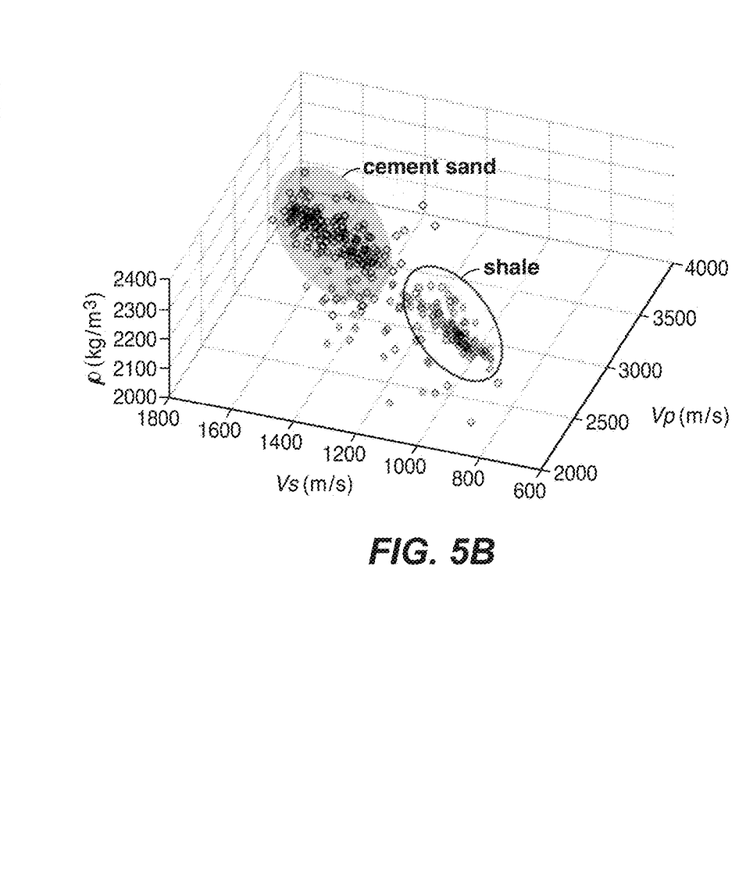
FIG. 5B shows the clustering of the same well log measurements and how the relationship between well log measurements varies with rock type or lithofacies.

Step 103 is determining a rock physics model relating the rock and fluid properties contained in the earth model to the geophysical properties sensed by the survey data. Various types of models could be employed in the inventive method to characterize the relationship between an effective material property of the sample and the volume fractions of the material phases that compose the rock. The use of any such model is within the scope of the invention. These models could be based on some simplifying physical approximations, as with theoretical models based on differential effective medium (DEM) theory or self-consistent (SC) theory. Alternatively, the functional forms used in empirical models could be employed. For example, the slope and intercept of a linear curve fit could be determined from laboratory or well-log measurements. For example, FIG. 5A shows a set of well log data containing Vp, Vs and density and FIG. 5B shows the corresponding scatter plots. Given that, lines could then be fit through the clusters of data points in FIG. 5B to determine a relationship among Vp, Vs, and rho. A different line would be fit for each rock type since a different trend clearly exists for each rock type. In one embodiment, horizons would be interpreted in a 2D or 3D seismic image which define boundaries between rock types according to methods familiar to those skilled in the art. Rock physics models would be determined within each of the intervals between horizons at the location where those horizons intersected a well. The rock physics model determined at the well would be applied throughout the 3D volume of the subsurface which was bounded above and below by the same horizons.

Step 104 is determining a noise statistic characterizing the uncertainty in the rock physics model. Referring to FIG. 5B, the data for each trend may be fitted with a best straight line, but the scatter of data about that line is what is referred to as the noise associated with the selected rock physics model. In other words, the trends described by rock physics models have some uncertainty due to natural variability in structure and composition. This uncertainty can be found for a particular model by subtracting the best fit model predictions of bulk properties from measured bulk properties. Statistics describing the uncertainty may then be calculated, such as a variance or standard deviation of the error, an autocorrelation function describing the error correlation as a function of difference in depth between sample points, or a covariance matrix capturing the covariance between errors in model predictions of different bulk properties such compressional and shear wave velocities.

Rock physics models are calibrated and their errors are characterized typically on core plug or well log measurements. Core plugs are samples of rock with dimensions on the order of 3 cm. Well logs sample volumes of rock on the order of 1 m in linear dimension. Geophysical surveys, however, sense rock properties at scales on the order of 50 m for seismic surveys, and on the order of 500 m for resistivity and gravity surveys. Statistics of rock physics model uncertainty derived at core plug or log scale should be compensated for this scale difference before being applied to rock property variability as sensed by geophysical surveys. This compensation should include adjusting both the trend line and the amount of scatter around that line.

The constraints on the inversion provided by the rock physics model may be written as, $f(\theta,x,y,z)=n(x,y,z)$ where f is a deterministic, spatially varying vector function of the rock composition and bulk properties, $\theta$, and n is the error vector representing the uncertainty in the rock physics models. In one embodiment, this relationship is linearized around a prior local estimate of the properties $\theta_0(x,y,z)$. In this linearized form, the rock physics model constraints can be written as:

$$A(\theta-\theta_0)=n$$

where A is the matrix of derivatives of the error with respect to each property in $\theta$, where the derivatives are evaluated at $\theta_0$. In one embodiment, n will be considered to be a zero-mean Gaussian random vector (one element per constraint) with covariance matrix P.

Step 105 is selecting a geophysical forward model which relates the geophysical survey data to the sensed geophysical properties of the subsurface. For example, the geophysical forward model for a seismic survey would predict the recorded seismic data traces for each source-and-receiver pair as a function of the elastic properties and density throughout the subsurface. The geophysical forward model for a magnetotelluric survey would predict the measured components of the electrical and magnetic fields at each sensor position as a function of the electrical impedance tensor throughout the subsurface. The geophysical forward model for a CSEM survey would predict the measured components of the electrical and magnetic fields for each pair of source and receiver positions as a function of the electrical impedance tensor throughout the subsurface. The geophysical forward model for a gravity survey would predict the measured variation in the earth's gravitational field at each gravimeter position as a function of the density structure of the subsurface.

With the benefit of this disclosure, persons of ordinary skill in the art will recognize various geophysical forward models that could be used in embodiments of the invention. A particular model for each data type in each application may be selected based on a tradeoff between geophysical forward model accuracy and computational speed.

Figure 4A:
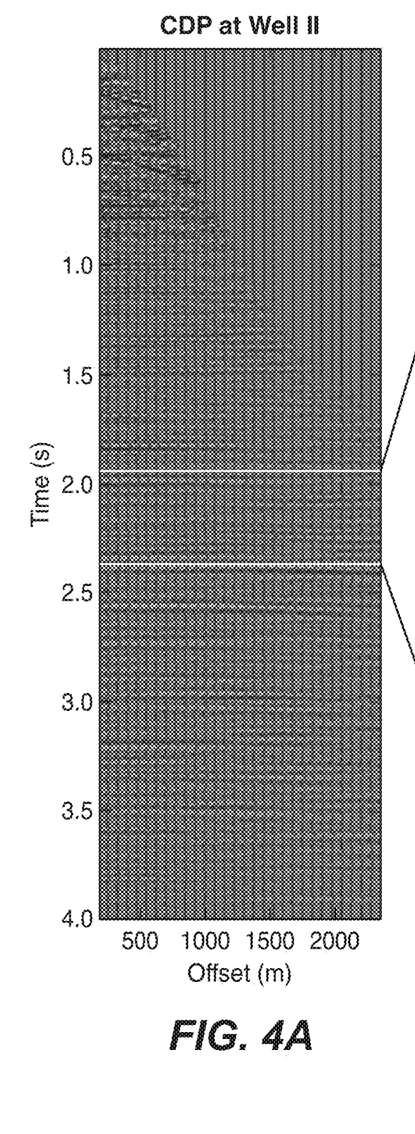
FIG. 4A shows an example of a common depth point gather or CDP gather near a well location for the full range of recorded travel time.
Figure 4B:
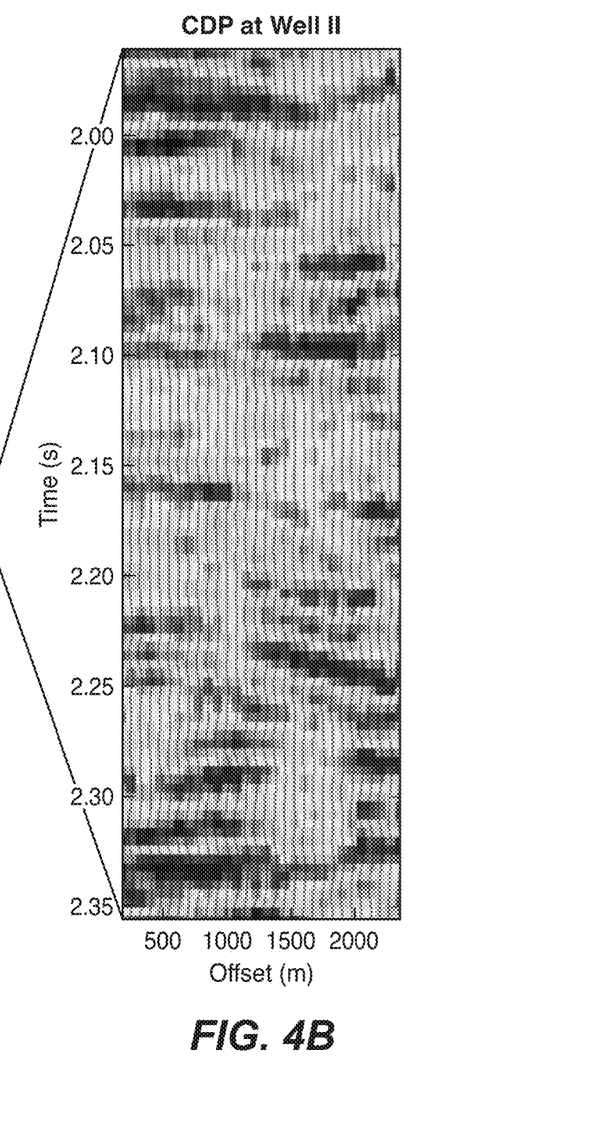
FIG. 4B shows the same data for a smaller time window.
Figure 6:
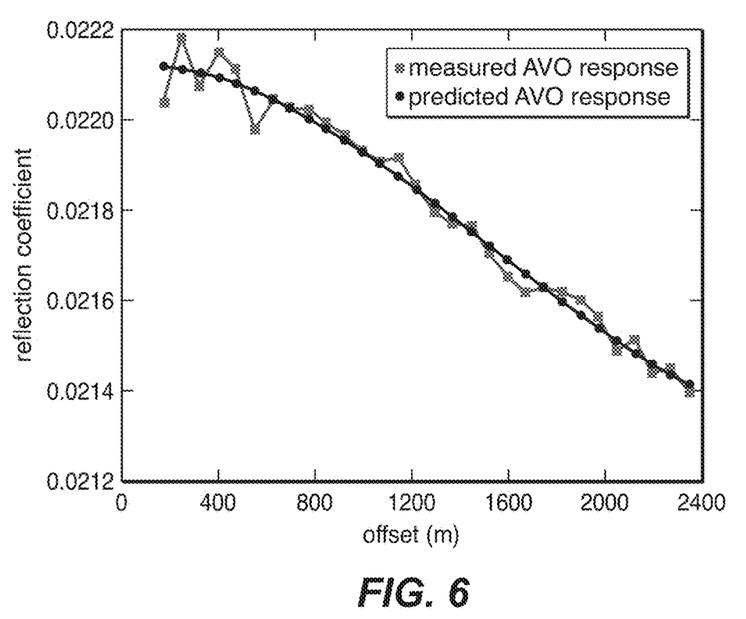
FIG. 6 shows the measured reflection amplitude versus offset for the CDP point in FIG. 4 at a given reflector and the corresponding predicted reflection amplitude for a given choice of earth model properties.

A novel geophysical forward model is now described which is used in one embodiment of the invention. This model approximates hydrocarbon reservoirs as being composed of two different rock types, a permeable rock which contains the hydrocarbons, such as a sandstone or a permeable limestone, and an impermeable seal rock which prevents the hydrocarbons from escaping from the reservoir, such as a shale or impermeable limestone. Several such layers may be contained in the 10 to 100-meter depth intervals resolvable by seismic data and numerous such layers are commonly contained in the 100 to 1000-meter depth intervals resolvable by resistivity or gravity surveys. Within the depth interval of seismic resolution, the properties of the permeable rock layers are often similar, and the properties of the impermeable rock layers are often similar. The seismic reflection amplitudes as a function of source-receiver offset from such an interbedded system of two distinct rock types is approximately that of a reflection from a single interface between the rock types as described by Zoeppritz equations or Aki-Richards equations or other equations that approximate the Zoeppritz equations, except for a scale factor that has a magnitude and sign that depends on the layer thicknesses within the interval of resolution. There is additional uncertainty in the scale factor due to imperfect knowledge of the seismic wave attenuation between the surface and reflector as well as uncertainty in the source amplitude, receiver sensitivity, coupling between the earth and the source and receivers, and spreading of the signal. Thus, in one embodiment, the geophysical forward model for seismic data traces d in a common depth point gather after moveout correction is, $$d(t)=w(t)*[u(t)r(\theta(t),t)]+v(t)$$

where "*" indicates convolution, r are the reflection coefficients from Zoeppritz equations for a reflection from an interface between two half-spaces of the rock types encountered at time t as a function of the incident angle, w is the seismic wavelet, and u is the scale factor for each time point. The contributions to u include geometrical spreading, attenuation, uncertainties related to the data acquisition, and the relative abundance of the two rock types. The noise in this model is v, which includes both random environmental noises and systematic errors due to the approximations made to formulate the model. A novel feature of this model is that it does not predict the seismic data trace based on a specific value for the elastic properties or density of the subsurface at any time or depth point. Instead, it predicts characteristics of the seismic data trace based on the elastic properties of all the rock types in the vicinity of each time or depth point. Data that were thought to conform to this model would be prepared for inversion by performing a deconvolution to remove the effect of w, and a scaling to remove the effect of u, leaving the processed reflection amplitudes $d(t)=r(\theta,t)+m(t)$. An example of such noisy data d(t) is shown in FIG. 6 as the curve with square markers. The other curve with disc markers is the model prediction. The noise after this processing and deconvolution is m, which in one embodiment is assumed to be zero-mean Gaussian with covariance matrix R, and the shale-over-sand reflection coefficients $r(\theta,t)$ may now be analyzed to determine the shale and sand properties effective at the subsurface location interrogated by this CDP gather of data at time t. FIGS. 4A and 4B provide an example data set of seismic reflection at a sequence of CDP points with the same horizontal locations. The variations of reflection amplitude as function of offset are shown across a range of two-way travel time. The parameter vector $\theta$ contains the typical properties of the two rock types within the resolution interval. This method of specifying the subsurface properties is believed to be a novel feature of this disclosure. The geophysical forward model in one embodiment of the invention relates the survey data to the typical properties of two distinct rock types over the interval of data resolution without specifying which rock type exists (and thus without specifying the properties that exist) at any particular point in the subsurface.

A second geophysical forward model is described which is used in one embodiment of the invention. In this embodiment, the geophysical forward model for seismic data traces in a common depth point gather after moveout correction may be represented as $$d(t)=w(t)*r(\theta(t),t)+v(t)$$

where "*" indicates convolution, r are the reflection coefficients from Zoeppritz equations for a reflection from an interface between two half-spaces of the rock types whose interface occurs at time t as a function of the incident angle, and w is the seismic wavelet. The noise in this model is v, which includes both random environmental noises and systematic errors due to the approximations made to formulate the model. Data that were thought to conform to this model would be prepared for inversion by performing a deconvolution to remove the effect of w, leaving $$d(t)=r(\theta,t)+m(t)$$

where the noise after this deconvolution is m, which in one embodiment is assumed to be zero-mean Gaussian with covariance matrix R.

In one embodiment of the invention, the relationship between the processed m reflection amplitudes and the rock properties is linearized around $\theta_0$ and $d_0=r(\theta_0)$ to give, $$d-d_0=C(\theta-\theta_0)+m$$

where C is the matrix of derivatives of each reflection amplitude with respect to each rock property.

Returning to FIG. 1, step 106 is determining a statistic describing the noise in the geophysical survey data. The geophysical survey data may be regarded as the sum of a component that is consistent with the geophysical forward model and a noise term. By definition, the noise term is the difference between the geophysical survey data and the geophysical forward model when applied to the correct geophysical properties for the subsurface. The noise term can be defined only with respect to a particular geophysical forward model and includes random or environmental noises as well as any systematic errors due to the approximations in the geophysical forward model. Statistics describing the noise can be calculated, for example, from a gather of geophysical survey data by finding the geophysical properties for the subsurface for which the geophysical forward model most nearly reproduces the gather of survey data, and subtracting the forward model result from the survey data. This difference is the noise in the survey data and statistics of this noise can be calculated. Examples of statistics of the noise include a variance or standard deviation of the noise, an autocorrelation function of the noise, cross-correlation functions between noises at different receiver locations or source-receiver offsets, and covariance matrices between noises at different receiver locations or source-receiver offsets.

Step 107 is estimating a subsurface property or properties, for example in the case of seismic data, the fluid velocity and density or their linear combination. Let the property of interest be $\alpha = h(\theta)$. Linearizing around $\theta_0$ gives $$\alpha = h(\theta_0) + H(\theta - \theta_0),$$

where H is a row vector with each element the derivative of $\alpha$ with respect to each of the properties in $\theta$. In one embodiment, the estimate of the subsurface property is a minimum mean squared error estimate of $\alpha$ from d, call it $\alpha_{est}(d)$:

$$\alpha_{est}(d) = h(\theta_0) + H[A^T P^{-1} A + C^T R^{-1} C]^{-1} C^T R^{-1} (d - d_0).$$

In some cases, the system may not be sufficiently linear to obtain a good estimate of $\alpha$ with one iteration. In that case, in one embodiment, the system may be relinearized around each new estimate of $$\theta_{est} = \theta_0 + [A^T P^{-1} A + C^T R^{-1} C]^{-1} C^T R^{-1} (d - d_0)$$

until convergence is achieved. FIG. 6 shows one example of the measured data and the corresponding model prediction (smooth curve) obtained from a converged solution, at a specific CDP point.

Step 108 is using the estimate of the subsurface property to assess the commercial potential of a subsurface reservoir. The commercial potential of a subsurface reservoir is determined by a variety of factors including the type or types of fluid in the pore space of the reservoir rock, the porosity of the reservoir rock, and the permeability of the reservoir rock. The subsurface property that is estimated may be one of these properties or may be another property that correlates with one of these properties or may be another factor that influences the commercial potential of the reservoir.

Figure 2:
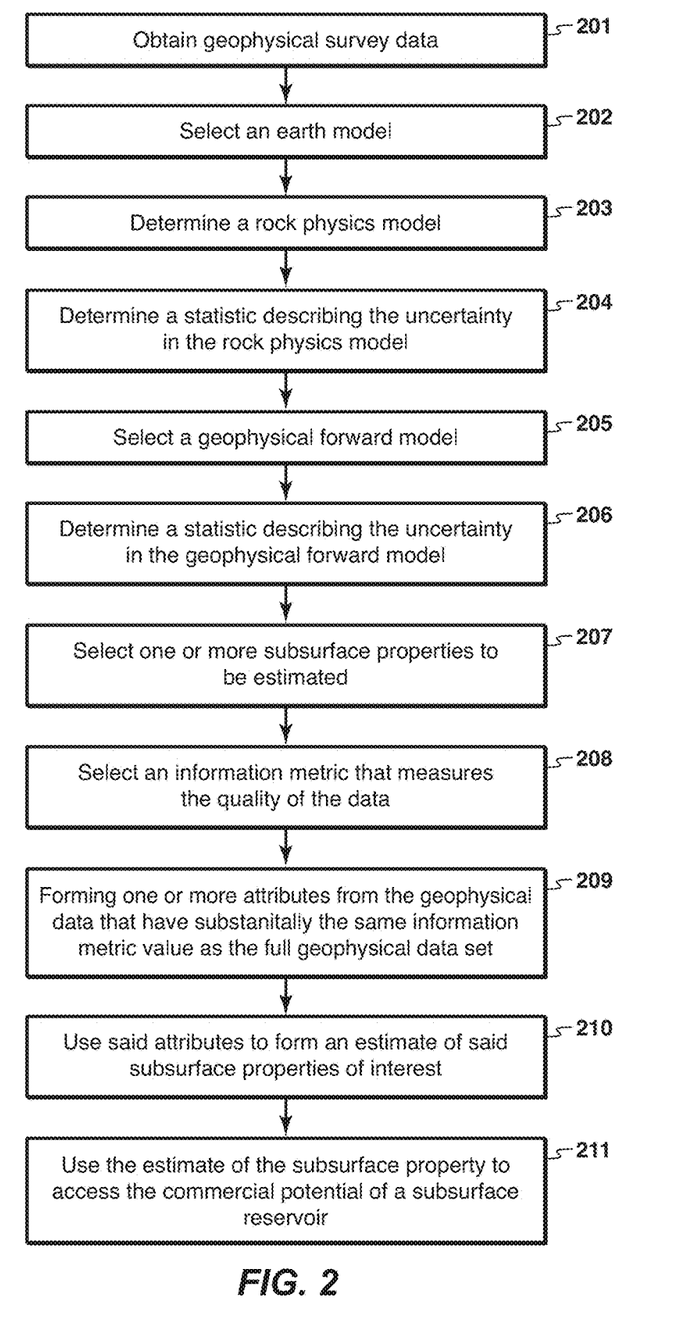
FIG. 2 is a flow chart showing basic steps in a second embodiment of the present inventive method.

A second embodiment of the invention will now be described. With reference to FIG. 2, this embodiment involves procedures to estimate the rock and fluid properties of a subsurface reservoir from geophysical survey data. As illustrated in FIG. 2, geophysical survey data is obtained (step 201). This step is the same as step 101 described previously. Steps 202-206 are also the same as steps 102-106, respectively.

Step 207 selects one or more subsurface properties to be estimated instead of the full set of model parameters $\theta$. These selected subsurface properties are typically quantities relevant to particular aspects of hydrocarbon commercial potential. For instance, this could be a certain direct hydrocarbon indicator ("DHI") x as a function of the model parameters i.e. $x = f(\theta)$. The subsequent steps then estimate these properties from a set of reduced attributes that preserve all the information in the raw survey data about x.

Step 209 is to apply a transformation to the geophysical data set d changing it into a much smaller data set of attributes, z. This transformation is selected to preserve substantially all of the information about the subsurface property or properties of interest that was present in d. In one embodiment, this transformation is linear, so that it is described by a matrix S which is an M×N matrix with M<<N, and z=Sd. To determine S, an information metric is defined (step 208) that will measure the extent to which a given S produces a z that captures the information of interest. In one embodiment, this information metric is $J(x|z=Sd)$, where $$J(x|z=Sd) = -tr\{F[(SC)^t(SRS^t)^{-1}(SC)]^{-1}F^t\}$$

where the rows of F consist of derivatives of $f(\theta)$. The matrices C, R are defined as previously. In one embodiment, we seek S to maximize the information metric, $$S = \underset{S \in R^{M \times N}}{\mathrm{argmax}} J(x|z=Sd)$$

In one embodiment, M is chosen to be the smallest integer value such that the value of $J(x|z=Sy)$ is substantially the same as when S is equal to the identity matrix. In another embodiment, M is the largest integer that still produces a data set z of manageable size. The resulting data are of size M and much smaller than the original size N, however, they preserve substantially the same amount of information regarding x.

Figure 7:
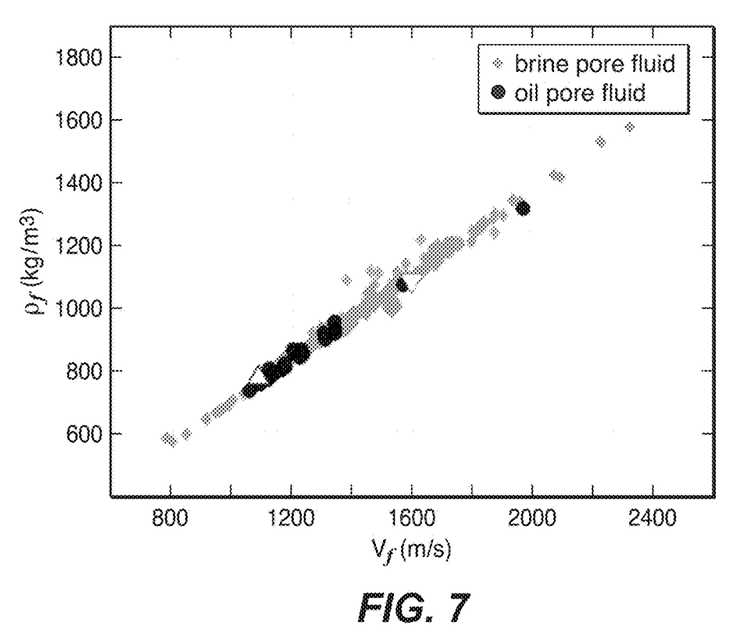
FIG. 7 shows the compressional wave velocity and density of the fluid at depth points within the time window shown in FIG. 4B as estimated using one embodiment of the inventive method.

Step 210 estimates the subsurface properties of interest, x, directly from the attributes z, instead of from the data d. In other words, the same optimization process described in connection with step 107 may be used in step 210, except that the reduced attribute data volume is used instead of the full data volume. Steps 209-210 may be iterated in nonlinear cases until the solution converges. As an example, FIG. 7 shows the scatter plot of the estimated fluid properties, including fluid velocity and density, throughout the spatial region defined in FIG. 4B.

Figure 8:
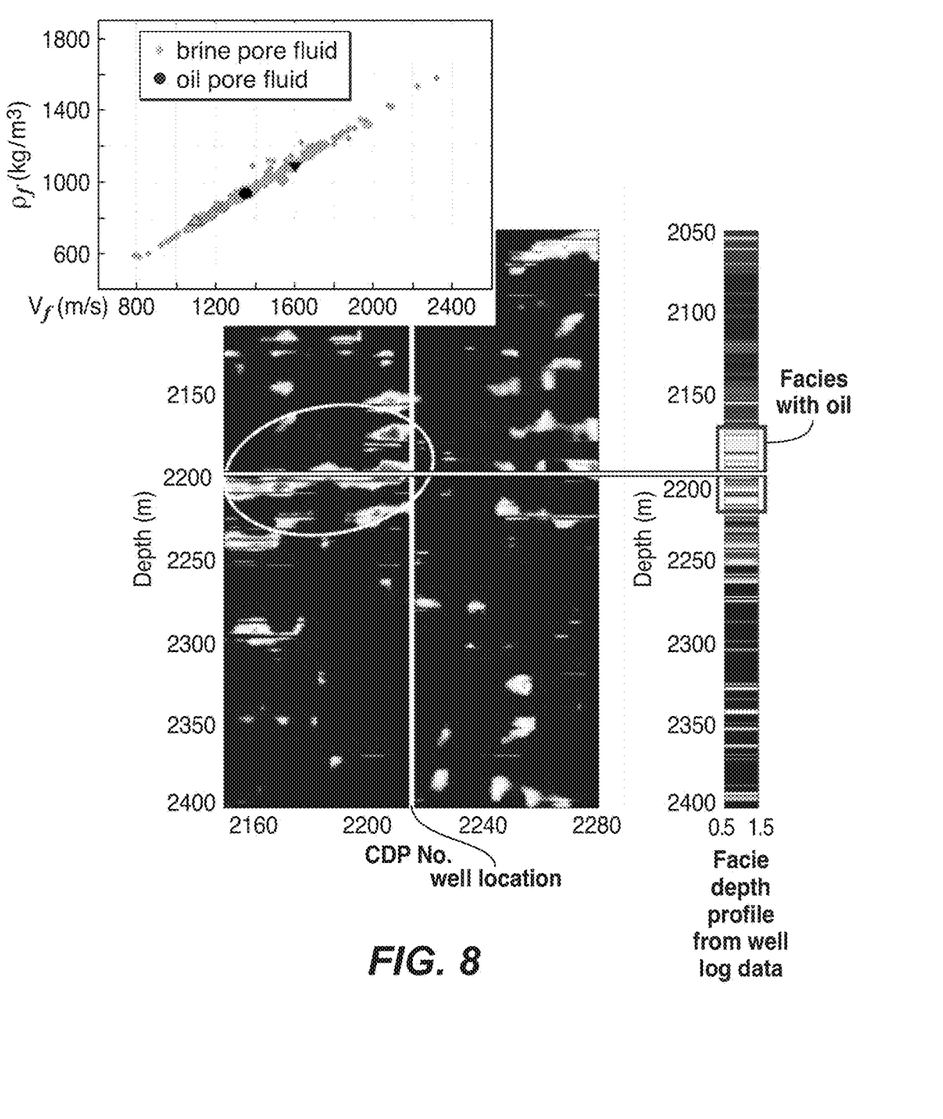
FIG. 8 shows the probability that a given point in the subsurface contains oil (rather than water) as estimated using one embodiment of the present inventive method.

Step 211 uses the resulting estimate of x to assess the commercial hydrocarbon potential of the reservoir as described in step 108. For instance, the resulting estimates given in FIG. 7 allow fluid type classification and the subsequent calculation of the probability of the fluid being oil or brine at each spatial location, which is shown in the color heat map in FIG. 8 (presented here as a black-and-white reproduction due to patent law restrictions on the use of color). The circled region showing significantly increased oil probability over a continuous area is matched consistently, through the horizontal line, with the well log oil facie profile.

Thus, a key advantage of the FIG. 2 embodiment of the present invention is that once a subset of parameters or DHI's has been identified (instead of using a fully parametric earth model that is fully populated over the computational grid), then all the input information that is needed is those portions of (or transformation of) the original data that contain the information relevant to these identified parameters or DHI's. That is, the reduced (in volume of data) attributes derived from the original data are specific to the chosen subset of parameters or the DHI. For example, the attributes that would be relevant for estimating rock porosity would be different than for estimating fluid velocity.

Among the advantages of this approach is that it enables inverting directly for a DHI, which is not necessarily a parameter in the earth model to be inverted, or in current practice has to be interpreted after the inversion, e.g. computing Poisson's ratio from inverted Vp and Vs, which comes with the high cost of doing a full data-set inversion. Directly computing the DHI from data without multiple intermediate steps results in a smaller parameter model space, as well as a smaller attribute space to work with. Moreover the approach of FIG. 2 potentially leads to better inversion of the subset of interested parameters due to the fact that all the relevant information is preserved, which is not necessarily the case in multi-stage process. This may include improved convergence because the problem may be better conditioned due to the need to estimate only a smaller parameter set over a potentially patchy distribution. Where the other parameters are not of interest, this can be the preferred embodiment of the invention.

The foregoing application is directed to particular embodiments of the present invention for the purpose of illustrating it. It will be apparent, however, to one skilled in the art, that many modifications and variations to the embodiments described herein are possible. With the benefit of the disclosure herein, persons of ordinary skill in the art will recognize that the inventive method may be applied to relate other effective properties besides seismic properties, permeability, and conductivity to structure and composition. For example, density, magnetic permeability, thermal conductivity, and nuclear magnetic resonance relaxation times can all be related using the inventive method to the structure and composition of rocks. All such modifications and variations are intended to be within the scope of the present invention, as defined in the appended claims. Persons skilled in the art will also readily recognize that in preferred embodiments of the invention, at least some of the steps in the present inventive method, for example steps 107 and 210, are performed on a computer, i.e. the invention is computer implemented. In such cases, the resulting model parameters may either be downloaded or saved to computer memory.

REFERENCES

Avseth et al., *Quantitative Seismic Interpretation: Applying Rock Physics Tools to Reduce Interpretation Risk*, Cambridge University Press, particularly pages 336-338 (2010).

We claim:

1. A computer-implemented method for estimating a subsurface property, and uncertainty associated with the estimate, from geophysical measurements, said method comprising:

determining one or more rock type trends in the subsurface, and identifying a rock physics model for each trend that mathematically relates the subsurface property to one or more geophysical properties;

determining a statistic describing uncertainty in each rock type trend and its rock physics model;

selecting a geophysical forward model for predicting the geophysical measurements using current values of the subsurface property at a plurality of subsurface spatial locations;

determining a statistic describing uncertainty in the geophysical forward model in predicting the geophysical measurements;

forming an estimate of the subsurface property and its associated uncertainty, using a computer, which estimate minimizes misfit between the geophysical measurements and forward-modeled predictions of the geophysical measurements, using the one or more rock type trends and their rock physics models, the uncertainties in the rock type trends and in the forward model, and using the estimate of the subsurface property to assess commercial potential of a subsurface reservoir.

2. The method of claim 1 wherein the geophysical measurements are at least one of: seismic data traces, stacked seismic data, angle stacks of seismic data, pre-stack gathers of seismic data, seismic reflection amplitudes, resistivity survey traces, gravity survey traces, passively recorded seismic signals, and any combination thereof.

3. The method of claim 1, wherein the subsurface property is pore fluid density, acoustic velocity in the pore fluid, a fluid factor combining the density and velocity of the pore fluid, porosity of reservoir rock, volume fraction of shale in the reservoir rock, volume fraction of at least one pore type composing the reservoir rock, volume fraction of at least one mineral type composing the reservoir rock, permeability of the reservoir rock, or any combination thereof.

4. The method of claim 1, wherein the geophysical measurements are seismic data, and the rock type trends and the uncertainty in each rock type trend and its rock physics model are extrapolated guided by interpreted horizons in the seismic data.

5. The method of claim 1, further comprising:
selecting an information metric that measures quality of the geophysical measurements;
using the information metric to reduce amount of measured data with minimal loss of information relevant to the subsurface property.

6. The method of claim 5, wherein the subsurface property is a direct hydrocarbon indicator.

7. The method of claim 1, wherein the minimizing misfit uses a linearized optimization process.

8. The method of claim 7, wherein the linearized optimization process is iterated.

* * * * *